No. 859,681. PATENTED JULY 9, 1907.
E. T. MORRIS.
CULVERT MOLD.
APPLICATION FILED DEC. 5, 1906.
2 SHEETS—SHEET 1.
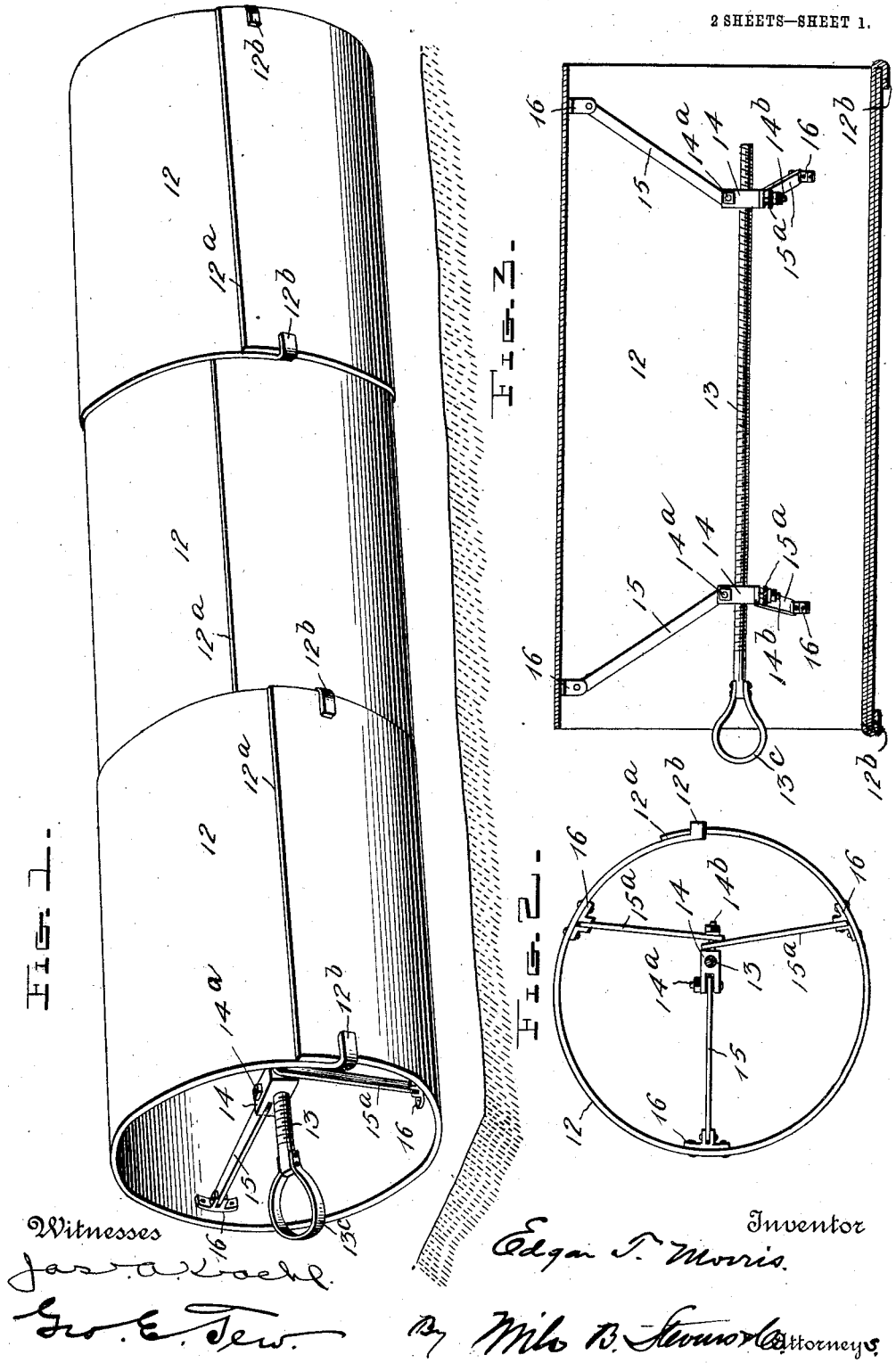

No. 859,681.  PATENTED JULY 9, 1907.

E. T. MORRIS.
CULVERT MOLD.
APPLICATION FILED DEC. 5, 1906.

2 SHEETS—SHEET 2.

Witnesses
Inventor
Edgar T. Morris.
By Milo B. Stevens & Co.
Attorneys

UNITED STATES PATENT OFFICE.

EDGAR T. MORRIS, OF ELBURN, ILLINOIS.

CULVERT-MOLD.

No. 859,681.      Specification of Letters Patent.      Patented July 9, 1907.

Application filed December 5, 1906. Serial No. 346,425.

*To all whom it may concern:*

Be it known that I, EDGAR T. MORRIS, a citizen of the United States, residing at Elburn, in the county of Kane and State of Illinois, have invented new and useful Improvements in Culvert-Molds, of which the following is a specification.

This invention relates to molds for making culverts or pipes of concrete or the like, *in situ*, and comprises an expansible form provided with means located within the same to expand or contract it. The core or mold may be extended for long work by joining a series of the forms, as hereinafter shown and described. The forms may be contracted to permit of their removal from the molded structure.

The invention is illustrated in the accompanying drawings, in which

Figure 4:
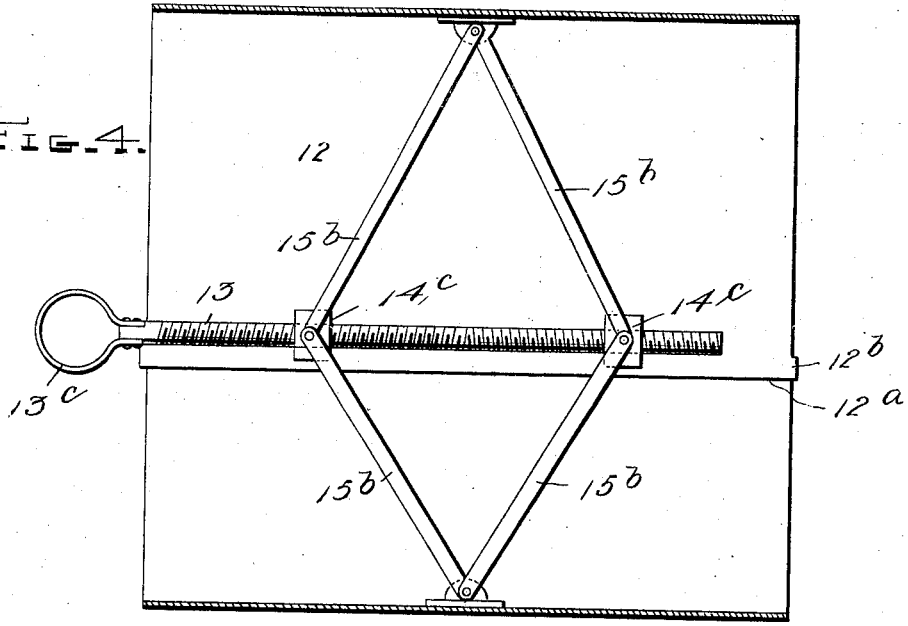
Figure 5:
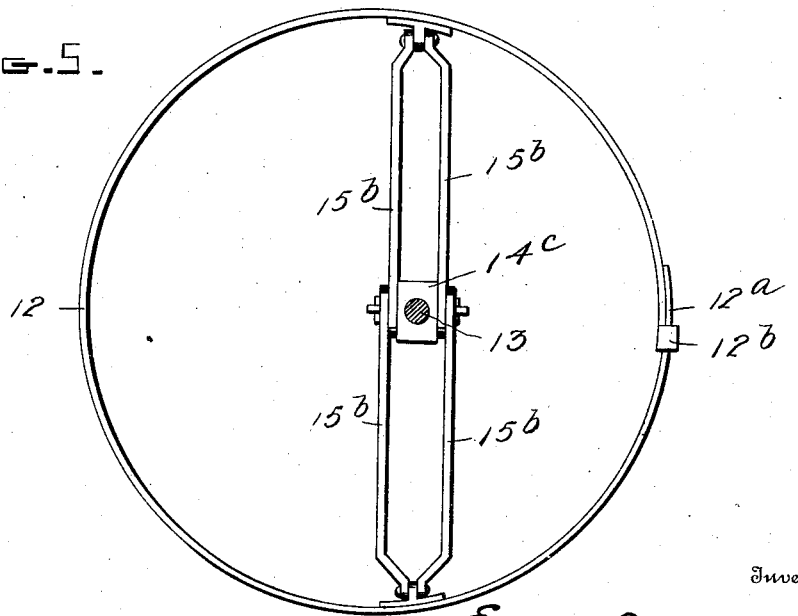

Figure 1 is a perspective view showing the forms placed in position for laying the concrete culvert. Fig. 2 is a cross section of the same. Fig. 3 is a longitudinal section of one of the forms. Fig. 4 is a view in section of a modification of the expansible mold. Fig. 5 is an end view of the same.

In using the device a bed of concrete is first laid and then the forms or molds are laid in place thereon. One or a series of these molds may be employed according to the length of the culvert to be made; and when several are used they are connected together by lapping the ends at the joints, the inner ones being less expanded and the outer ones expanded sufficiently to slip over them. These mold sections when first laid are placed on the bed of concrete, as shown in Fig. 1, and are expanded by devices hereinafter mentioned, each section being provided with individual expanding and contracting devices. When the sections are in position the concrete is filled in around the same to make the complete form, and when it is hardened the mold sections are contracted and then may be withdrawn endwise from the structure. A mold section comprises a split form 12 of flexible sheet metal preferably cylindrical in shape, and having one of its side edges overlapping the other, as at $12^a$.

To expand or contract the form I employ the following devices: 13 is a rod, screw-threaded right and left, at opposite ends, and 14 are screw-threaded nuts mounted on same. Extending from each nut are arms 15 and $15^a$ connected to suitable brackets 16 on the sides of the form. All of the arms are pivotally connected to the brackets 16. The arm 15 is pivotally connected to the nut 14 by means of a bolt $14^a$ which extends through ears projecting from the side of the nut and through a hole in the end of the arm. The arms $15^a$ are pivotally connected to the opposite side of the nut by means of a bolt $14^b$ which extends through eyes in the end of the arms and is tapped into the side of the nut. The arms $15^a$ extend in substantially opposite directions, the three arms being arranged at an angle to each other so as to form a sort of three sided toggle which is expanded or contracted by the travel of the nut along the screw.

The edges of the shield 12 overlap as already mentioned. At the ends of one of these overlapping edges I preferably provide tongues $12^b$ which are folded over the ends of the other edge and hold the lapped parts in proper position.

At one end of the screw-threaded rod 13 is a handle or loop $13^c$, which furnishes means for operating the said screw so as to expand or contract the form, and also a means for pulling out the form after molding. The forms too far within the culvert to be reached by hand may be worked or pulled out by a rod having a hook which will connect with the loop.

An especial feature of the invention is that the screw 13 is located eccentrically with respect to the cylinder, being off-set from the center toward the lapped edges $12^a$ thereof, and the arms $15^a$ extend oppositely from the nuts to connection with the cylinder on opposite sides of said edges. The direction of strain on the arms $15^a$ is substantially parallel to the plane of the lapped edges and consequently the force is applied tangentially, which is much more effective in shifting said edges with respect to each other than if the force were applied radially. Hence the expansion or contraction of the cylinder may be readily performed, with little liability of the edges sticking, and without the application of great force. Also, the said disposition of the arms $15^a$ affords a stronger support against shifting of the lapped edges and collapse of the form under weight, than if the arms were radially disposed.

In Figs. 4 and 5, a modification is shown in which the toggle has only two arms, each having a pair of plates $15^b$ pivotally connected between the inner wall of the cylinder and a nut $14^c$ on the screw. The toggle may be formed double, as shown in Fig. 4, with opposite nuts and arms, the nuts traveling on right and left threads on the screw. In this form, also, the screw is preferably eccentric or off-set toward the lapped edges.

I claim:

1. A mold comprising a split cylinder of flexible material, a toggle having arms connected to the cylinder on opposite sides of the split respectively, the toggle being off-set from the center of the cylinder toward the split side thereof, and means to operate the toggle.

2. A mold comprising a cylinder of flexible material split lengthwise on one side, a screw extending lengthwise in the cylinder and off-set eccentrically toward said split, a traveling nut on the screw, and toggle arms connected between the nut and the cylinder on opposite sides of the split.

In testimony whereof I have signed my name to this specification in the presence of two subscribing witnesses.

EDGAR T. MORRIS.

Witnesses:
NELLIE FELTSKOG,
H. G. BATCHELOR.